United States Patent
Kudo et al.

(10) Patent No.: US 11,115,583 B2
(45) Date of Patent: Sep. 7, 2021

(54) APPARATUS AND METHOD FOR DETERMINATION OF A FOCUS DETECTION TARGET

(71) Applicant: CANON KABUSHIKI KAISHA, Tokyo (JP)

(72) Inventors: Keisuke Kudo, Tokyo (JP); Takayuki Akaguma, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/446,380

(22) Filed: Jun. 19, 2019

(65) Prior Publication Data

US 2020/0007780 A1 Jan. 2, 2020

(30) Foreign Application Priority Data

Jun. 29, 2018 (JP) .............................. JP2018-125534
Jun. 29, 2018 (JP) .............................. JP2018-125535
Jun. 29, 2018 (JP) .............................. JP2018-125536

(51) Int. Cl.
*H04N 5/232* (2006.01)
*G06T 7/20* (2017.01)
*G06K 9/00* (2006.01)

(52) U.S. Cl.
CPC ... *H04N 5/232127* (2018.08); *G06K 9/00228* (2013.01); *G06T 7/20* (2013.01); *H04N 5/23219* (2013.01)

(58) Field of Classification Search
CPC ............................ H04N 5/23212; G03B 13/00
See application file for complete search history.

(56) References Cited

U.S. PATENT DOCUMENTS 5,604,562 A * 2/1997 Aoyama ................. G02B 7/102
396/121
8,477,194 B2 * 7/2013 Matsuno ............ H04N 5/23219
348/169

FOREIGN PATENT DOCUMENTS

| JP | 2001-21794 A | 1/2001 |
| JP | 2002-072069 A | 3/2002 |
| JP | 2011-107396 A | 6/2011 |
| JP | 2015-198264 A | 11/2015 |
| JP | 2017-026914 A | 2/2017 |
| JP | 2017-103601 A | 6/2017 |
| JP | 2018-087864 A | 6/2018 |

* cited by examiner

*Primary Examiner* — Kyle M Lotfi
(74) *Attorney, Agent, or Firm* — Canon U.S.A., Inc. IP Division

(57) ABSTRACT

An apparatus determines an object and controls driving of the focus lens based on a focus detection result.

12 Claims, 15 Drawing Sheets

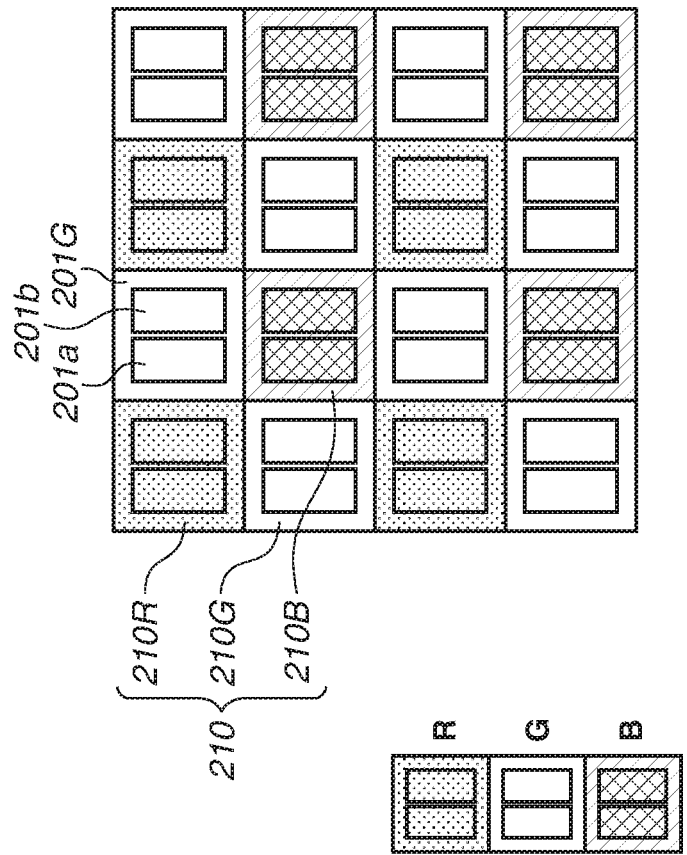
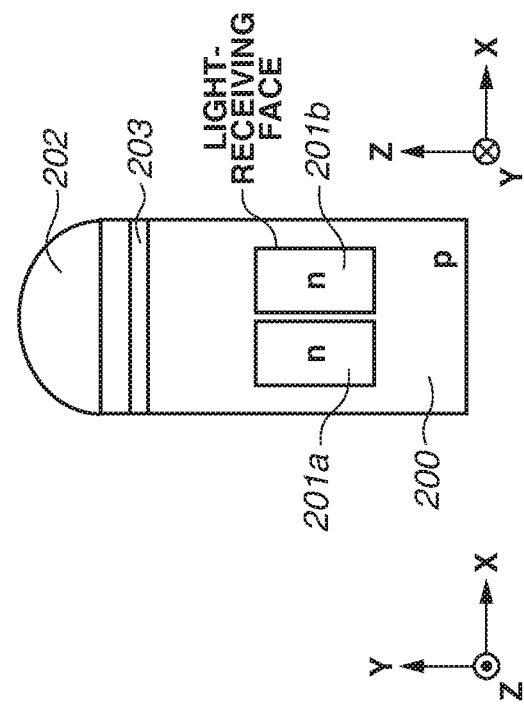

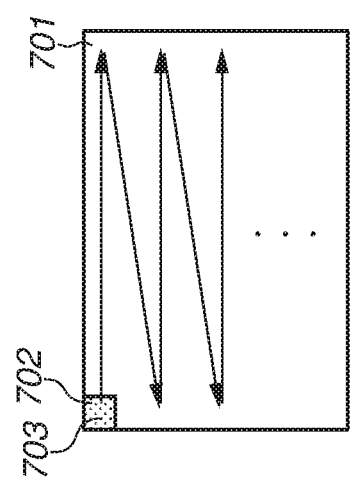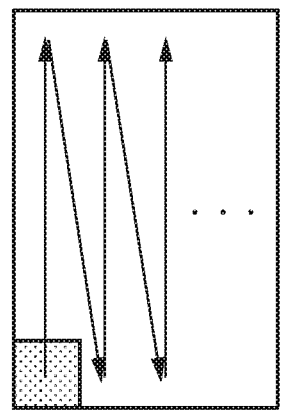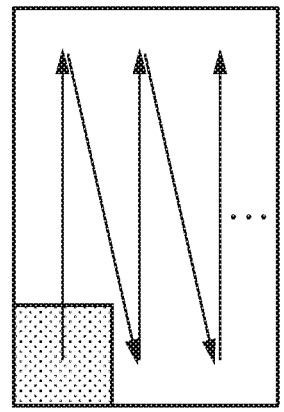

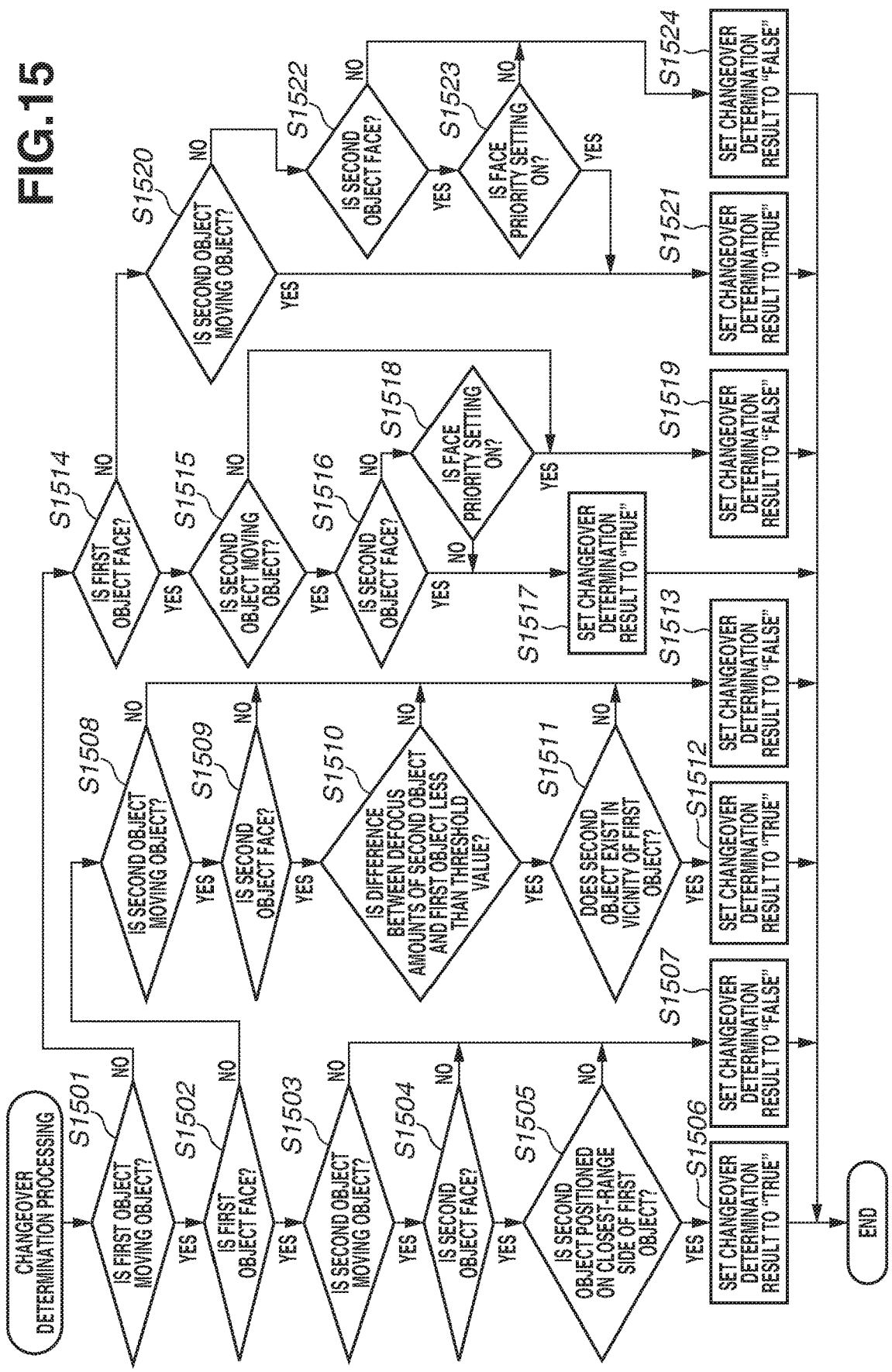

APPARATUS AND METHOD FOR DETERMINATION OF A FOCUS DETECTION TARGET

BACKGROUND OF THE INVENTION

Field of the Invention

The aspect of the embodiments relates to determination of an object as a target of focus adjustment.

Description of the Related Art

Conventionally, an imaging apparatus that executes auto-focusing (also called as "AF") based on a focus status of a focus detection area has been known.

Japanese Patent Application Laid-Open No. 2002-072069 discusses a technique which enables an imaging apparatus to automatically select one focus detection area used for focus adjustment from among a plurality of focus detection areas. According to the technique described in Japanese Patent Application Laid-Open No. 2002-072069, since a photographer does not have to manually select a focus detection area, an operation procedure for capturing an image can be simplified. However, with the technique described in Japanese Patent Application Laid-Open No. 2002-072069, the following situations arise when an image of a moving object is captured by continuously executing auto-focusing. Even in a case where an object that is being tracked as a main object to be focused is different from a main object intended by a user, focus adjustment is continuously performed on the erroneously detected main object. Further, even if the main object is detected correctly, there is a case where the main object is changed dynamically to another, so that an object that is being tracked is not the main object intended by the user. In such a case, a focus cannot be continuously adjusted to the main object intended by the user.

SUMMARY OF THE INVENTION

According to an aspect of the embodiments, an apparatus includes a first determination unit configured to determine a first object, a first focus detection unit configured to acquire a first focus detection result by executing focus detection on the first object, a control unit configured to control driving of a focus lens based on the first focus detection result, a second determination unit configured to determine a second object, a second focus detection unit configured to acquire a second focus detection result by executing focus detection on the second object, a storage unit configured to store the second focus detection result, and a judgment unit configured to judge whether the second object is an object to be tracked by the focus lens. In a case where the second object is judged as an object to be tracked by the focus lens, the first determination unit determines the second object as a new first object, and the control unit controls driving of the focus lens based on the second focus detection result.

Further features of the disclosure will become apparent from the following description of exemplary embodiments with reference to the attached drawings.

BRIEF DESCRIPTION OF THE DRAWINGS

FIGS. 3A and 3B are diagrams illustrating a pixel structure of an image sensor.

FIGS. 7A, 7B, and 7C are block diagrams illustrating evaluation pixels and estimation areas according to the first exemplary embodiment.

FIG. 15 is a flowchart illustrating changeover judgment processing according to a third exemplary embodiment.

DESCRIPTION OF THE EMBODIMENTS

Hereinafter, exemplary embodiments of the disclosure will be described in detail with reference to the appended drawings.

<Imaging System>

Figure 2:
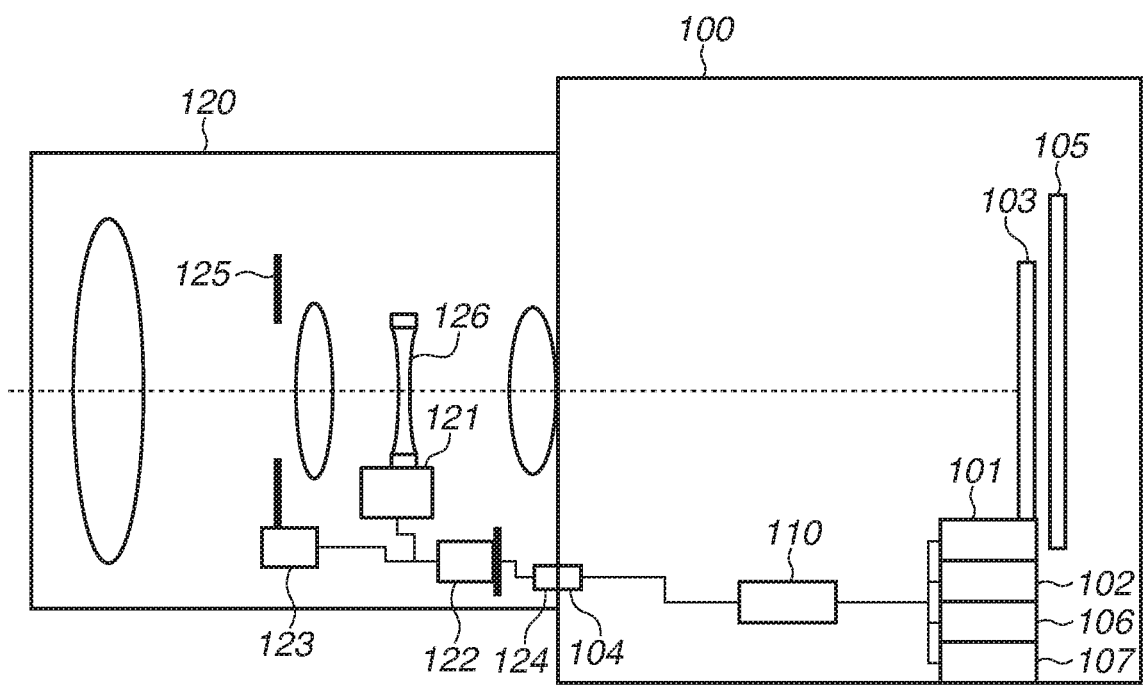
FIG. 2 is a cross-sectional diagram of a camera according to a first exemplary embodiment.

Hereinafter, a first exemplary embodiment will be described. FIG. 2 is a cross-sectional diagram illustrating a camera including an imaging apparatus according to the present exemplary embodiment of the disclosure.

Figure 1:
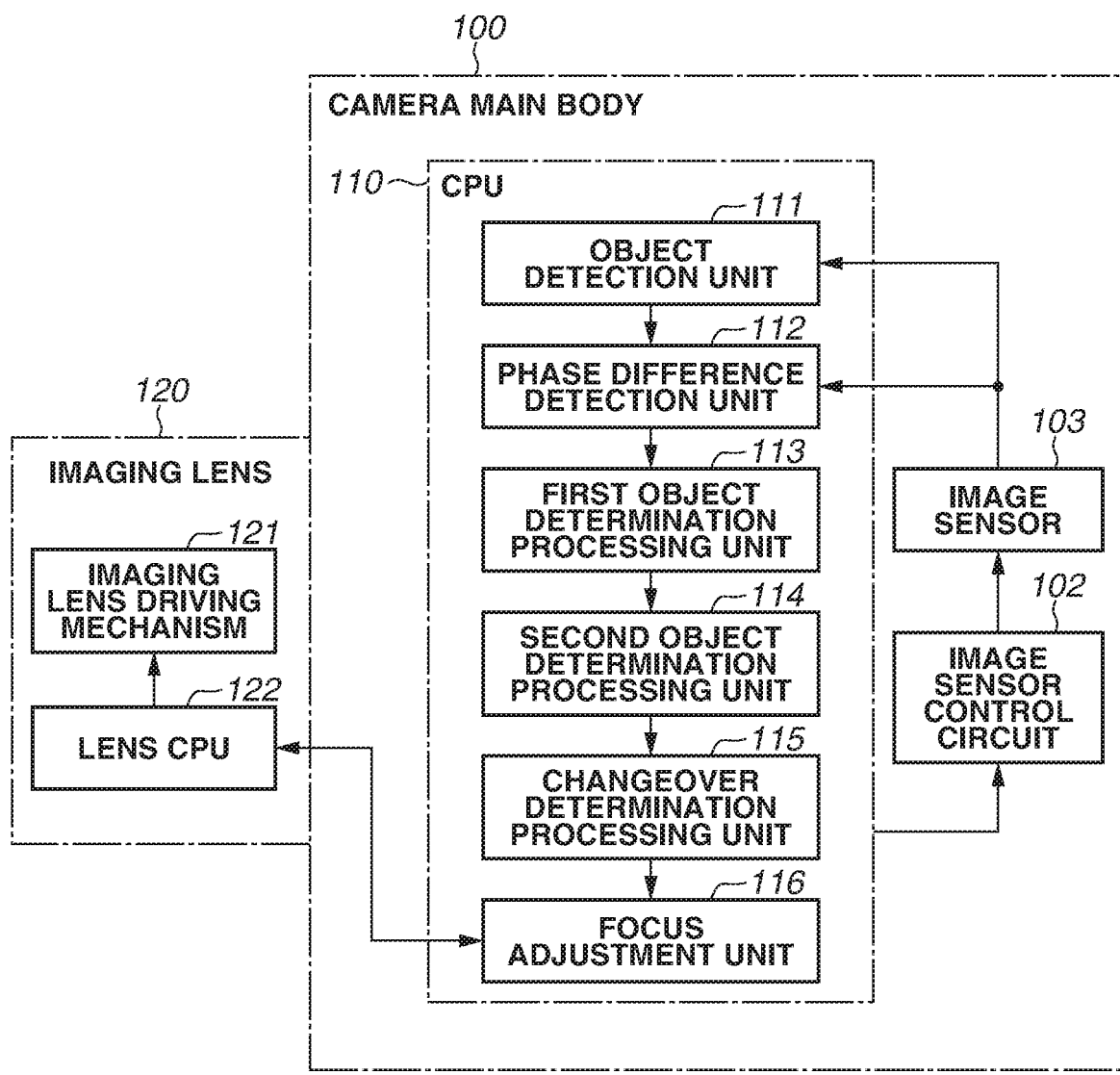
FIG. 1 is a functional block diagram of a portion related to an imaging apparatus of a camera.

FIG. 1 is a functional block diagram illustrating a portion related to the imaging apparatus of the camera in the present exemplary embodiment.

Generally, a camera is provided with two types of operation modes, i.e., a mode in which a lens is driven with respect to an image plane of an object at a certain time (i.e., one-shot imaging mode) and a mode in which a lens is driven while a future image plane of an object is being estimated (i.e., servo-imaging mode). In the present exemplary embodiment, operation of the camera that is set to the servo-imaging mode will be described.

The camera according to the present exemplary embodiment is an interchangeable-lens digital camera in which a camera main body 100 including an image sensor 103 is used in combination with an imaging lens 120 including an imaging optical system.

The camera main body 100 includes an image sensor 103, a display unit 105, a central processing unit (CPU) 110, an image sensor control circuit 102, a memory circuit 101, an interface circuit 106, an image processing unit 107, and an electric contact 104.

The image sensor 103 is configured of a complementary metal oxide semiconductor (CMOS) image sensor or a charge coupled device (CCD) image sensor, and arranged on an expected image-forming plane of the imaging lens 120 of the camera main body 100. The image sensor 103 will be described below in detail.

The display unit 105 is configured of a liquid crystal display (LCD) panel, and displays a captured image or information such as imaging information. Further, in a live-view mode, the display unit 105 displays a moving image of an expected imaging area on a real-time basis. In the live-view mode, an object image acquired from the imaging lens 120 is captured by the image sensor 103, and a low-definition moving image for preview is displayed on the display unit 105 on a real-time basis. In this live-view mode, it is possible to execute below-described phase difference AF on the imaging plane. Further, when continuous imaging operation is executed, low-definition still images acquired through the continuous imaging operation are displayed on the display unit 105.

The CPU 110 generally controls the entirety of the camera and executes various kinds of calculation or judgment. The CPU 110 includes an object detection unit 111, a phase difference detection unit 112, a first object determination processing unit 113, a second object determination processing unit 114, a changeover judgment processing unit 115, and a focus adjustment unit 116. Further, the CPU 110 outputs a driving instruction of a focus lens 126 based on detection of a focus state (also called as "focus detection") of the imaging lens 120 and a result of the detection. In a case where focus detection is executed on a plurality of areas, the CPU 110 executes selection processing thereof.

The object detection unit 111 executes processing for detecting an object based on an image signal acquired from the image sensor 103. The processing for detecting an object includes face detection processing for detecting a face. Further, as a method of detecting an object, below-described conspicuousness is calculated. Further, based on a characteristic of an image signal acquired from the image sensor 103, the object detection unit 111 detects the object and calculates a tracking position. The processing executed by the object detection unit 111 may be executed by employing known processing, e.g., template matching processing or histogram matching processing.

The phase difference detection unit 112 detects a phase difference of a pair of image signals acquired from the image sensor 103.

The first object determination processing unit 113 determines an object position to which a focus position is to be moved. In other words, the first object determination processing unit 113 determines an object to be specified as a main object (also called as "first object").

The second object determination processing unit 114 determines a second object as a candidate that can be the first object.

The changeover judgment processing unit 115 judges whether a focus position should be adjusted to the second object rather than the first object determined at that point in time. In other words, the changeover judgment processing unit 115 judges whether the second object is the main object.

The focus adjustment unit 116 instructs a lens CPU 122 to move the focus position based on a defocus amount converted from a phase difference signal detected by the phase difference detection unit 112 at the first object position.

The image sensor control circuit 102 executes driving control of the image sensor 103 according to an instruction from the CPU 110. The memory circuit 101 stores an image signal captured by the image sensor 103. Further, the memory circuit 101 stores a light receiving distribution of the image sensor 103.

The interface circuit 106 outputs an image signal on which image processing is executed by the image processing unit 107 to an exterior portion of the camera.

The image processing unit 107 executes image processing on an image signal captured by the image sensor 103.

The electric contact 104 is in contact with an electric contact 124 of the imaging lens 120 and used for transmitting and receiving electric power or various signals.

The imaging lens 120 is an interchangeable lens attachable to and detachable from the camera main body 100.

The imaging lens 120 includes an imaging optical system, a lens CPU 122, a focus lens driving mechanism 121, an aperture driving mechanism 123, an aperture 125, and an electric contact 124. The imaging optical system includes a focus lens 126.

The imaging optical system forms an optical image of a captured object on the image sensor 103. The imaging optical system is configured of a group of lenses, and driven by the focus lens driving mechanism 121 to move a focus position in a vicinity of the imaging plane of the image sensor 103 in a Z direction. In the present exemplary embodiment, an operation for adjusting a focus position to an object is also called as "focus adjustment".

The lens CPU 122 receives focus adjustment information transmitted from the CPU 110 of the camera main body 100 via the electric contact 124, and drives the focus lens driving mechanism 121 based on the focus adjustment information.

The aperture driving mechanism 123 includes a mechanism for driving the aperture 125 and an actuator thereof, and drives the aperture 125 according to an instruction from the lens CPU 122.

<Structure of Image Sensor>

Next, a pixel structure of the image sensor 103 according to the present exemplary embodiment will be described with reference to FIGS. 3A and 3B. FIGS. 3A and 3B are diagrams illustrating a pixel structure of the image sensor 103. FIG. 3A is a diagram illustrating a pixel array of the image sensor 103, and FIG. 3B is a cross-sectional diagram of a pixel 210G taken along a Z-X plane.

In FIG. 3A, a pixel array of the image sensor 103 (two-dimensional CMOS sensor) is illustrated in a pixel range of 4 rows by 4 columns. The Bayer array is employed for the array of pixels 210. Two pixels 210G having green (G) spectral sensitivity are diagonally arranged in the pixel range. Further, a pixel 210R having red (R) spectral sensitivity and a pixel 210B having blue (B) spectral sensitivity are respectively arranged as the other two pixels. Each of the pixels 210R, 210G, and 210B includes two sub-pixels 201*a* and 201*b* for pupil division. Further, the sub-pixel 201*a* is a first pixel that receives a light flux passing through a first pupil area of the imaging optical system. Further, the sub-pixel 201*b* is a second pixel that receives a light flux passing through a second pupil area of the imaging optical system. Each of the pixels 210 functions as an imaging pixel or a focus detection pixel.

With respect to the coordinate axes X, Y, and Z illustrated in FIG. 3A, an X-Y plane is positioned on a sheet plane of FIG. 3A, whereas the Z-axis is an axis perpendicular to the sheet plane. The sub-pixels 201*a* and 201*b* are arranged in a direction parallel to the X-axis.

With respect to the coordinate axes X, Y, and Z illustrated in FIG. 3B, an X-Z plane is positioned on a sheet plane of FIG. 3B, whereas the Y-axis is an axis perpendicular to the sheet plane. A detection portion includes a photodiode configured of a p-type layer 200 and an n-type layer. A micro-lens 202 is arranged at a position away from a light-receiving face by a predetermined distance in the Z-axis direction. The micro-lens 202 is formed on a color filter 203.

In the present exemplary embodiment, the sub-pixels 201a and 201b for pupil division are arranged on all of the pixels 210R, 210G, and 210B of the image sensor 103. The sub-pixels 201a and 201b are used as focus detection pixels. However, the present exemplary embodiment is not limited thereto, and pupil division pixels used for focus detection may be arranged on only a part of the pixels.

<Concept of Pupil Division Function of Image Sensor>

Figure 4:
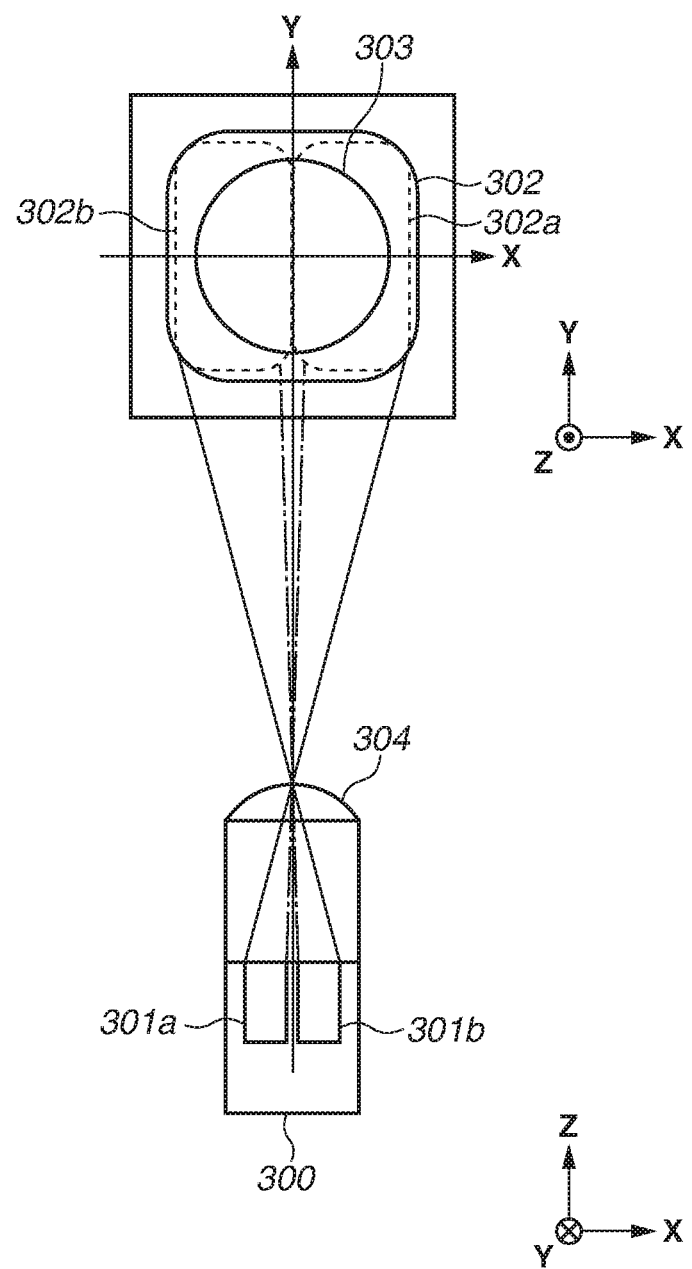
FIG. 4 is a diagram illustrating a pupil division function of an image sensor.

Subsequently, a pupil division function of the image sensor 103 will be described with reference to FIG. 4. FIG. 4 is a diagram illustrating a pupil division function of the image sensor 103, specifically a state of pupil division in one pixel portion.

With respect to the coordinate axes X, Y, and Z of the pixel portion illustrated on the lower side in FIG. 4, an X-Z plane is positioned on a sheet plane of FIG. 4, whereas the Y axis is an axis perpendicular to the sheet plane. A pixel includes a p-type layer 300 and n-type layers 301a and 301b. The p-type layer 300 and the n-type layer 301a constitute the sub-pixel 201a, and the p-type layer 300 and the n-type layer 301b constitutes the sub-pixel 201b illustrated in FIG. 3. A micro-lens 304 is arranged on the Z-axis.

Further, an exit pupil 302 and a frame 303 (e.g., an aperture frame or a lens frame) are illustrated on the upper side of FIG. 4. With respect to the coordinate axes X, Y, and Z illustrated on the upper side in FIG. 4, an X-Y plane is positioned on a sheet plane of FIG. 4, whereas the Z-axis is an axis perpendicular to the sheet plane.

Since the n-type layers 301a and 301b are embedded in the p-type layer 300, two sub-pixels are formed in one pixel. The two sub-pixels are regularly arranged in the x direction. Further, because the two sub-pixels are respectively decentered in the +X direction and the -X direction, pupil division can be executed by using a single micro-lens 304. In FIG. 4, a pupil 302a of an image signal A and a pupil 302b of an image signal B are illustrated as the exit pupil 302. The image signal A is a first image signal acquired by a sub-pixel corresponding to the n-type layer 301a decentered in the -X direction. Further, the image signal B is a second image signal acquired by a sub-pixel corresponding to the n-type layer 301b decentered in the +X direction.

As described above, in the present exemplary embodiment, the image signal A (first signal) is acquired from the plurality of sub-pixels 201a regularly arrayed in the X direction as illustrated in FIG. 3A. In other words, the image signal A is one of the image signals acquired from a pair of light fluxes passing through different pupil exit areas of an image-forming optical system, having the baseline lengths that are different depending on aperture values. Further, the image signal B (second signal) is acquired from the plurality of sub-pixels 201b regularly arrayed in the X direction as illustrated in FIG. 3A. In other words, the image signal B is the other of the image signals acquired from a pair of light fluxes passing through different pupil exit areas of the image-forming optical system, having the baseline lengths that are different depending on aperture values.

The CPU 110 calculates a relative image shift amount of the image signals A and B through the object detection unit 111, and calculates a defocus amount through the phase difference detection unit 112. In the present exemplary embodiment, a configuration that is applicable to an object having a luminance distribution of the X direction has been described. However, the present exemplary embodiment can also employ a configuration that is applicable to an object having a luminance distribution in the Y-direction by implementing the same configuration in the Y-direction.

<General Flow of Auto-Select Servo-AF>

Figure 5:
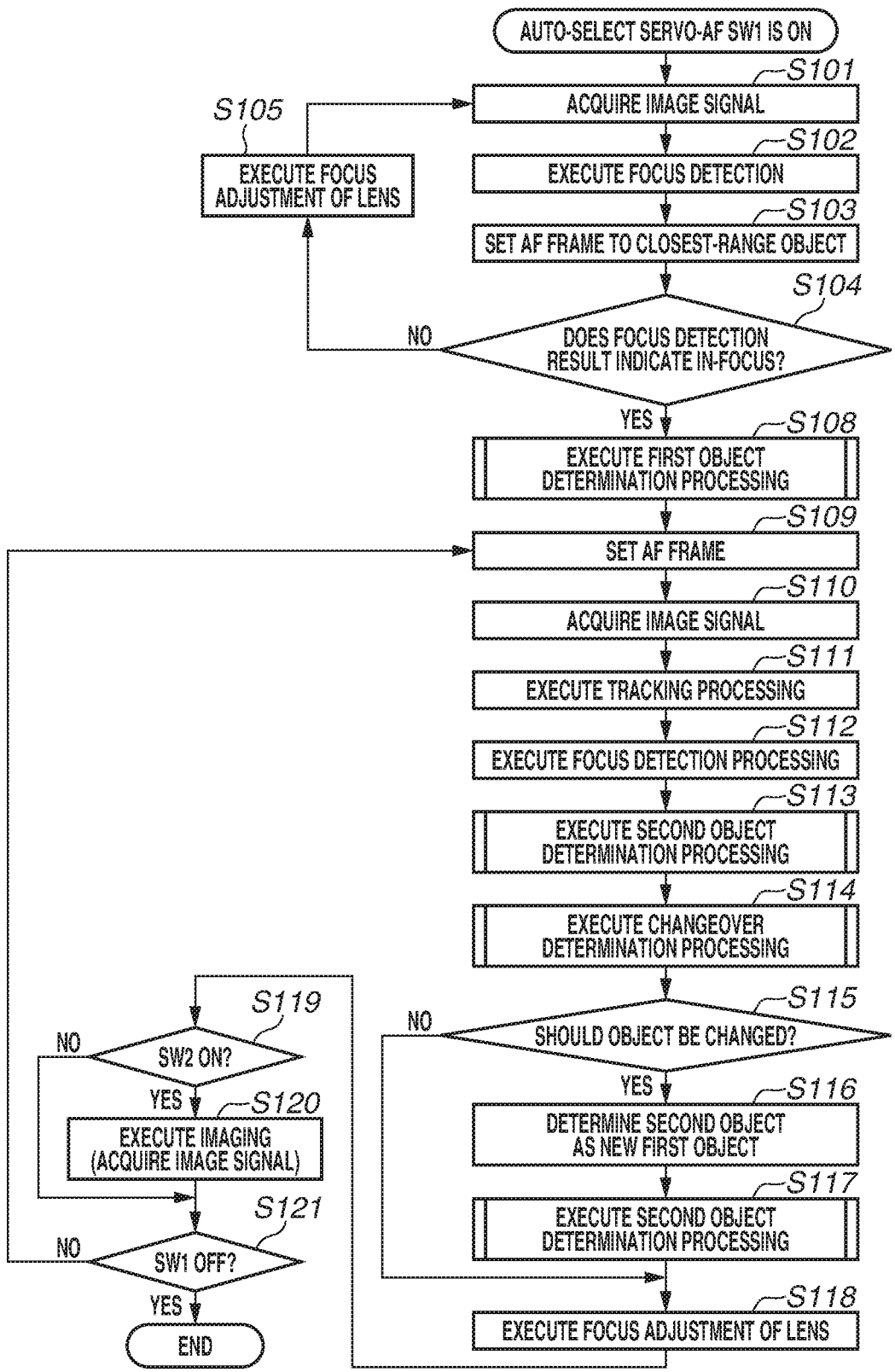
FIG. 5 is a flowchart illustrating a servo-imaging mode according to the first exemplary embodiment.

Next, a general flow of auto-select servo-AF will be described with reference to the flowchart in FIG. 5. In the auto-select servo-AF of the present exemplary embodiment, mainly for the purpose of capturing an image of a moving object, the imaging apparatus repeatedly executes processing for automatically selecting one focus detection area used for focus adjustment from among a plurality of focus detection areas and executing focus adjustment using the selected focus detection area.

A general overview of the auto-select servo-AF of the present exemplary embodiment will be described as follows. First, one object is determined as a main object in first object determination processing described below. Further, in second object determination processing described below, an object different from the main object is determined as an object (also called as "second object") regarded as a candidate of the main object. Then, in changeover judgment processing described below, it is judged that a focus position is to be adjusted to the second object rather than to the first object. In other words, it is judged whether the second object is the main object. Then, the object according to this judgment result is determined as a main object, and processing for continuously adjusting a focus is executed on the object.

First, in step S101, the CPU 110 acquires an image signal from the image sensor 103.

Next, in step S102, the CPU 110 executes focus detection of each frame in the entire screen based on the image signal acquired in step S101.

In step S103, the CPU 110 selects a closest position through the focus detection of each frame executed in step S102, and sets an AF frame to the closest object position. However, in a case where the AF frame has already been set to the closest object position, the AF frame may be fixed to the same AF frame set previously. In a case where the closest object position is distinctively different from the previous position, the AF frame may be newly set to another closest object position.

In step S104, the CPU 110 judges whether a focus detection result of the AF frame position calculated by the CPU 110 falls within an in-focus range. If the focus detection result falls within the in-focus range (YES in step S104), the processing proceeds to step S108, if the focus detection result falls outside the in-focus range (NO in step S104), the processing proceeds to step S105.

In step S105, the CPU 110 converts the focus detection result of the AF frame position calculated by the CPU 110 into a lens driving amount by the focus adjustment unit 116, and executes focus adjustment of the imaging lens 120.

In step S108, the CPU 110 executes first object determination processing to determine where to start tracking processing. Details of the processing will be described below in "First Object Determination Processing 1."

In step S109, the CPU 110 sets the AF frame at a first object position determined in step S108.

In step S110, the CPU 110 acquires an image signal from the image sensor 103.

In step S111, the CPU 110 executes tracking processing based on the image signal acquired in step S110. A first object and a second object candidate are objects to be tracked.

In step S112, the CPU 110 executes focus detection processing based on the image signal acquired from the image sensor 103 in step S110.

In step S113, the CPU 110 executes processing for determining a second object from the second object candidates detected in step S111. Details of this processing will be described below in "Second Object Determination Processing."

In step S114, the CPU 110 judges whether the second object is to be changed to the first object. Details of this processing will be described below in "Changeover Judgment Processing."

Based on a result of the changeover judgment processing executed in step S114, in step S115, if the CPU 110 judges that the object is to be changed (YES in step S115), the processing proceeds to step S116. If the CPU 110 judges that the object is not to be changed (NO in step S115), the processing proceeds to step S118.

In step S116, the CPU 110 determines the second object as a new first object.

In step S117, the CPU 110 executes the second object determination processing.

In step S118, the focus detection result of the AF frame position calculated by the CPU 110 is converted into a lens driving amount by the focus adjustment unit 116, and focus adjustment of the imaging lens 120 is executed.

In a case where the second object is newly determined as the first object, a focus detection result may be acquired again by newly calculating and setting an AF frame position, and the focus adjustment unit 116 converts that focus detection result into a lens driving amount to execute focus adjustment of the imaging lens 120.

In step S119, the CPU 110 judges whether a release switch (SW2) is pressed. If the release switch (SW2) is pressed (YES in step S119), the processing proceeds to step S120, and if the release switch (SW2) is not pressed (NO in step S119), the processing proceeds to step S121.

In step S120, the memory circuit 101 records the image signal acquired by the image sensor 103.

In step S121, the CPU 110 judges whether an AF switch (SW1) is OFF. If the AF switch (SW1) is ON (NO in step S121), the processing returns to step S109, and if the AF switch (SW1) is OFF (YES in step S121), the entire flow of the auto-select servo-AF is ended.

As described above, in the auto-select servo-AF of the present exemplary embodiment, firstly, a certain object is determined as the first object. Further, an object different from the first object is determined as a candidate of the main object in the second object determination processing. Then, in a case where the CPU 110 judges that the focus is to be adjusted to the second object rather than to the first object, the second object is determined as the first object (i.e., the main object). With this configuration, an appropriate object can be determined as a main object even in a case where the determined main object is not the object intended by the user, or an object that is to be determined as the main object is changed because of the movement of the object.

<First Object Determination Processing 1>

Figure 9:
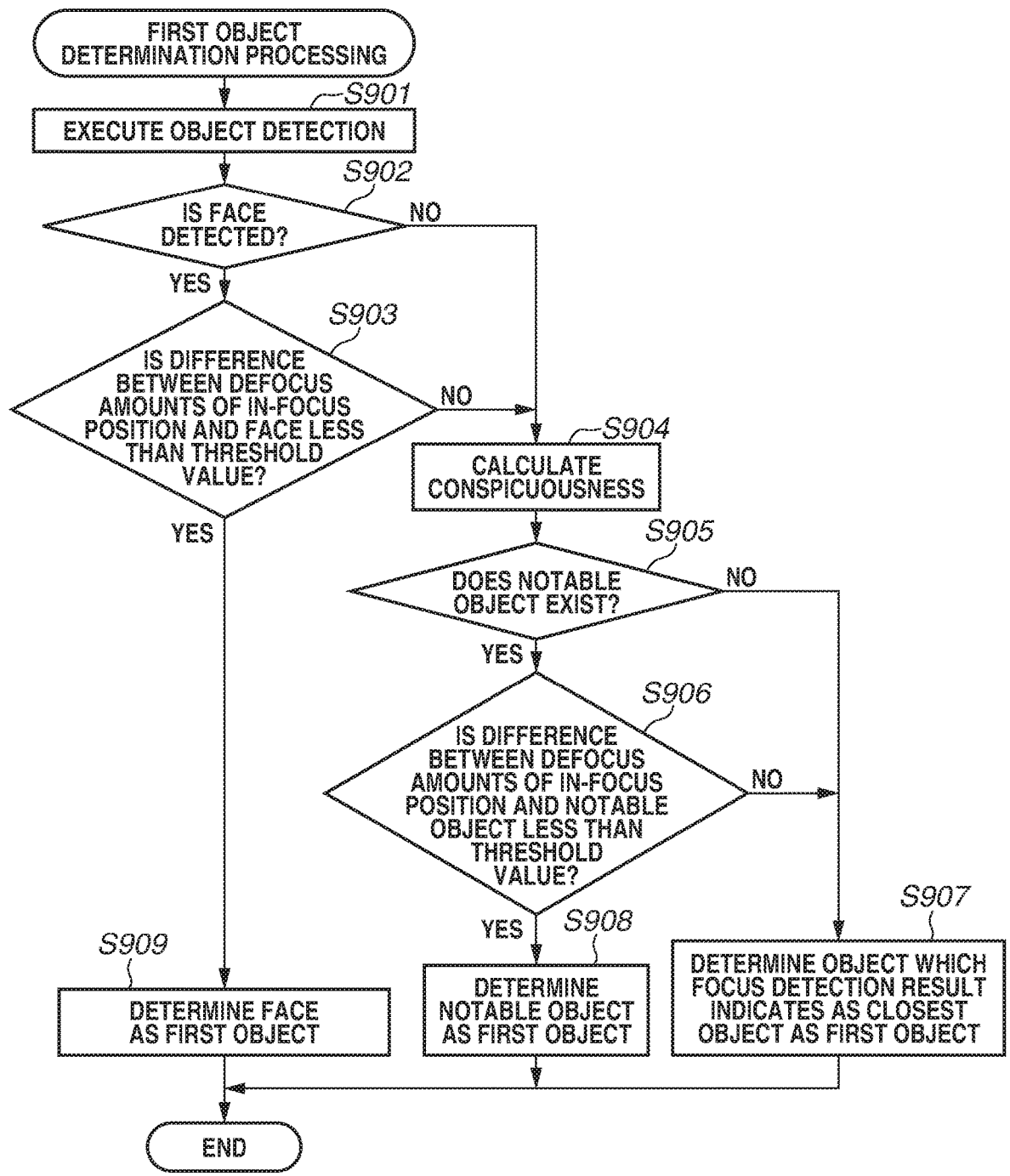
FIG. 9 is a flowchart illustrating first object determination processing according to the first exemplary embodiment.

Herein, the first object determination processing 1 executed in step S114 of the flowchart in FIG. 5 will be described in detail with reference to a flowchart in FIG. 9. As described above, the first object determination processing is processing for determining the first object as a main object. In step S901, the CPU 110 executes object detection from the image signal acquired from the image sensor 103.

In step S902, the CPU 110 judges whether a face is detected as an object in step S901. If a face is detected (YES in step S902), the processing proceeds to step S903. If a face is not detected (NO in step S902), the processing proceeds to step S904.

If a face is detected in step S901, in step S903, the CPU 110 compares a difference between defocus amounts of the in-focus position and a position corresponding to the face with a first threshold value. In order to prevent the in-focus position once adjusted to an object from being suddenly changed to a position of another object in the back, e.g., a face in the audience, the processing proceeds to step S909 if a difference between a defocus amount of the in-focus position and a defocus amount of a position corresponding to the face is less than the first threshold value (YES in step S903), and the processing proceeds to step S904 if the difference is the first threshold value or more (NO in step S903).

A focus can be adjusted to an object detected as a face more easily if a range of the first threshold value is wider. However, there is a possibility that a focus is adjusted to another object, for example, detected as a face in the background audience, which is not intended by the user. Therefore, the same threshold value may be set on both of the infinity-range side and the close-range side of the in-focus position, or a range thereof may be set to be narrower on the infinity-range side and wider on the close-range side.

In step S904, the CPU 110 calculates conspicuousness from the image signal acquired from the image sensor 103, and based on the calculated conspicuousness, the CPU 110 judges whether an object having a notable characteristic (also called as "notable object") exists. The conspicuousness according to the present exemplary embodiment refers to a degree of conspicuousness of a characteristic, and the conspicuousness will be high if an object is noticeable and can be easily distinguished from a background. When the conspicuousness is a predetermined second threshold value or more, the CPU 110 judges that a notable object exists.

In the present exemplary embodiment, conspicuousness is judged based on hue, saturation, and luminance. For example, in a scene of a pink flower surrounded by green leaves, a main object should be at a position of the flower, and the flower can be assumed as a main object by judging based on the conspicuousness. Further, because of a similar reason, a ship on the sea or a bird flying in the sky can be also assumed as a main object by judging based on the conspicuousness. As described above, the conspicuousness can be one of the significant indexes for determining a main object. Therefore, in the present exemplary embodiment, a notable object is a candidate for determining the first object. A calculation processing method of the conspicuousness executed in step S904 will be described below.

In step S905, the CPU 110 judges whether the notable object exists in step S904. If the notable object exists (YES in step S905), the processing proceeds to step S906. If the notable object does not exist (NO in step S905), the processing proceeds to step S907.

In step S906, the CPU 110 compares a difference between a defocus amount of the in-focus position and a defocus amount of the notable object with the third threshold value, and judges whether the notable object exists in a vicinity of the in-focus position. This is because a highly-notable object such as an advertising display, which the user does not want to select as a main object, may exist in a background or at the edge of the X-Y axis plane. Thus, a notable object at a position considerably deviating from the current in-focus position is to be eliminated. If the difference between the defocus amount of the in-focus position and the defocus amount of the notable object is less than the third threshold value, and a position of the notable object on a plane surface is in a vicinity of a position of the in-focus position on the plane surface (YES in step S906), the processing proceeds to step S908. Herein, in a case where a distance between a position of a central coordinate of the notable object and a coordinate position of the in-focus position on the X-Y axis plane is less than a fourth threshold value when the Z axis direction is taken as a defocus direction (depth direction), the CPU 110 judges that the position of the notable object on the plane surface is in a vicinity of the position of the in-focus position on the plane surface. Further, if a plurality of notable objects exists in the threshold range, an object of the highest conspicuousness is selected, and the processing proceeds to step S908. If the difference between the defocus amount of the in-focus position and the defocus amount of the notable object is the third threshold value or more, or the position of the notable object on the plane surface is not in a vicinity of the position of the in-focus position on the plane surface, or both of the above conditions are satisfied (NO in step S906), the processing proceeds to step S907.

In step S907, the CPU 110 determines, as the first object, the object which the focus detection result indicates as the closest object in step S103.

In step S908, the CPU 110 determines the notable object judged in step S904 as the first object.

In step S909, the CPU 110 determines the face as the first object.

<Color Conspicuousness Calculation Processing>

Processing for calculating color conspicuousness from an image signal will be described with reference to FIG. 6, FIGS. 7A to 7C, and FIG. 8.

Figure 6:
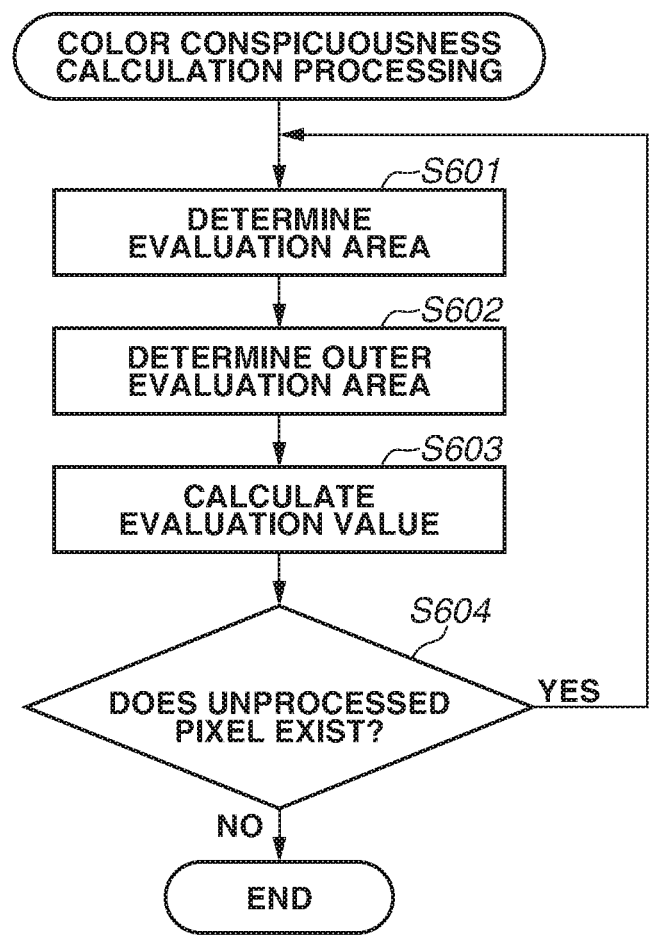
FIG. 6 is a flowchart illustrating a flow of color conspicuousness calculation processing according to the first exemplary embodiment.

First, in step S601 in FIG. 6, the CPU 110 determines an evaluation area for evaluating an image signal. The evaluation area is an area corresponding to an object as a target for evaluating the conspicuousness. FIG. 7A illustrates an input image 701, an evaluation pixel 702, and an evaluation area candidate 703. As illustrated in each of FIGS. 7A to 7C, the evaluation area candidate 703 is calculated in a plurality of sizes. A size of the evaluation area candidate 703 is a value calculated by multiplying a predetermined value by "n", e.g., 16 pixels, 32 pixels, or 64 pixels. The evaluation pixel 702 is sequentially selected from all of pixels in an input image through raster processing.

Figure 8:
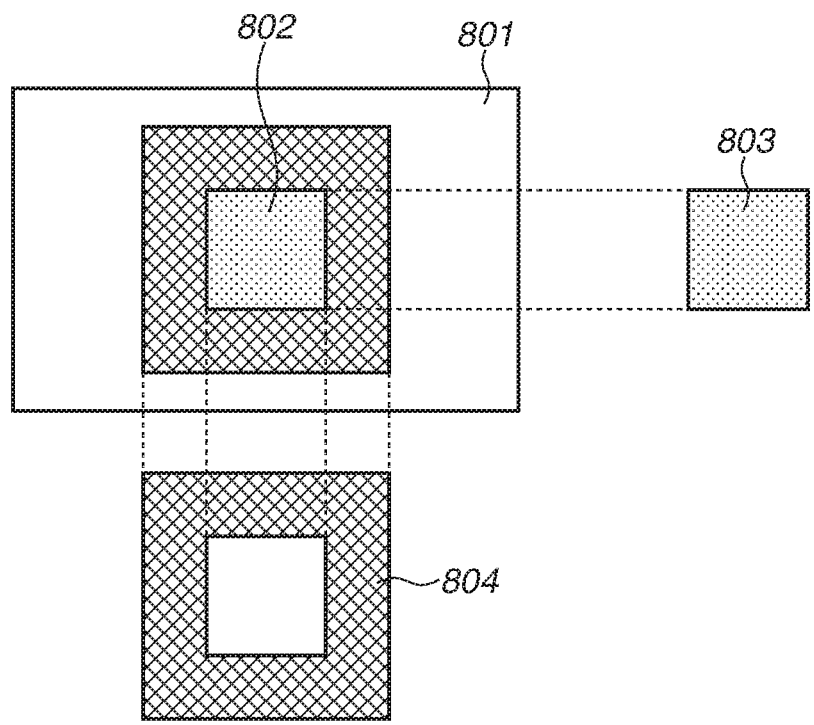
FIG. 8 is a block diagram illustrating an evaluation area according to the first exemplary embodiment.

Next, in step S602 in FIG. 6, the CPU 110 determines an outer evaluation area with respect to the evaluation area. The outer evaluation area is an area corresponding to a background. FIG. 8 illustrates an input image 801, an evaluation pixel 802, an evaluation area 803, and an outer evaluation area 804. As illustrated in FIG. 8, the outer evaluation area 804 has a central position corresponding to the evaluation area 803. Therefore, the outer evaluation area 804 is a toroidal area excluding the evaluation area 803, having an outer diameter size corresponding to a value acquired by adding a predetermined value to a size of the evaluation area 803. A ratio of an input image, e.g., 10% of a horizontal size of the input image, is determined as the predetermined value to be added thereto.

In step S603 in FIG. 6, the CPU 110 calculates a dissimilarity between image signals corresponding to the evaluation area and the outer evaluation area as a color conspicuousness evaluation value. A dissimilarity D is calculated using the following formulas.

$$d_H = \Sigma_{i=0}^{m} |p_{Hi} - q_{Hi}|$$

$$d_S = \Sigma_{i=0}^{m} |p_{Si} - q_{Si}|$$

$$d_V = \Sigma_{i=0}^{m} |p_{Vi} - q_{Vi}|$$

$$D = d_H + d_S + d_V$$

A value $d_H$ is dissimilarity calculated from hue information of the evaluation area and the outer evaluation area, a value $P_{Hi}$ is a number of pixels in the evaluation area having hue information i, and a value $q_{Hi}$ is a number of pixels in the outer evaluation area having the hue information i. Values $d_S$, $p_{Si}$, and $q_{Si}$ are similar to the values $d_H$, $P_{Hi}$ and $q_{Hi}$ and related to saturation information, and values $d_V$, $p_{Vi}$ and $q_{Vi}$ are also similar to the values $d_H$, $P_{Hi}$ and $q_{Hi}$ and related to luminance information. Further, a value m is a maximum value which the hue information, the saturation information, or the luminance information can take.

In step S604 in FIG. 6, the CPU 110 judges whether an unprocessed evaluation area exists. If an unprocessed evaluation area exists (YES in step S604), the processing returns to step S601, and a series of processing in FIG. 6 is repeated. If an unprocessed evaluation area does not exist (NO in step S604), the processing is ended.

Through the above-described processing, the color conspicuousness can be calculated based on the assumption that the object area has high dissimilarity in the image signals in the evaluation area and the image signals in the outer evaluation area.

<Second Object Determination Processing>

Figure 10:
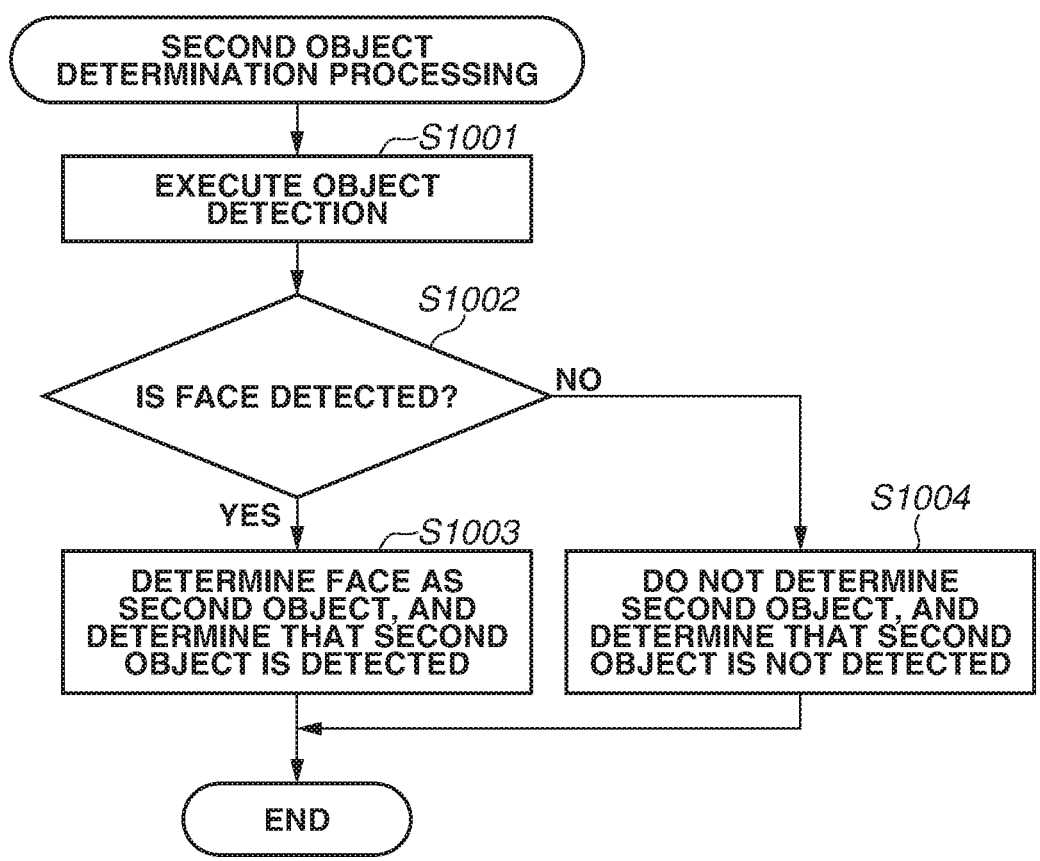
FIG. 10 is a flowchart illustrating second object determination processing according to the first exemplary embodiment.

Herein, the second object determination processing in steps S113 and S117 of the flowchart in FIG. 5 will be described in detail with reference to FIG. 10. As described above, the second object determination processing is processing for determining the second object as a candidate of the main object.

First, in step S1001, the CPU 110 detects an object from an image signal acquired from the image sensor 103 using the object detection unit 111.

In step S1002, based on a result of the detection executed in step S1001, the CPU 110 judges whether an object detected as a face different from the first object exists.

In step S1002, if the CPU 110 judges that an object detected as a face different from the first object exists (YES in step S1002), the processing proceeds to step S1003. In step S1003, the CPU 110 determines the face as the second object. Then, the CPU 110 judges that the second object is detected, and the second object determination processing is ended. As described above, an object detected as a face which is likely to be the main object is determined as a candidate of the main object. With this configuration, in a case where the first object is not the main object the user has intended, or another object different from the first object is more suitable for the main object, the object more suitable for the main object can be determined as the first object.

In step S1002, if the CPU 110 judges that an object detected as a face different from the first object does not exist (NO in step S1002), the processing proceeds to step S1004. In step S1004, the CPU 110 does not determine the second object but judges that the second object is not detected, and the second object determination processing is ended. If an object detected as a face different from the first object is not detected, it is assumed that there is no other object than the first object suitable for the main object. Therefore, an object as a candidate of the main object is not determined, so that the focus can be continuously adjusted to the object more suitable for the main object.

<Changeover Judgment Processing>

Figure 11:
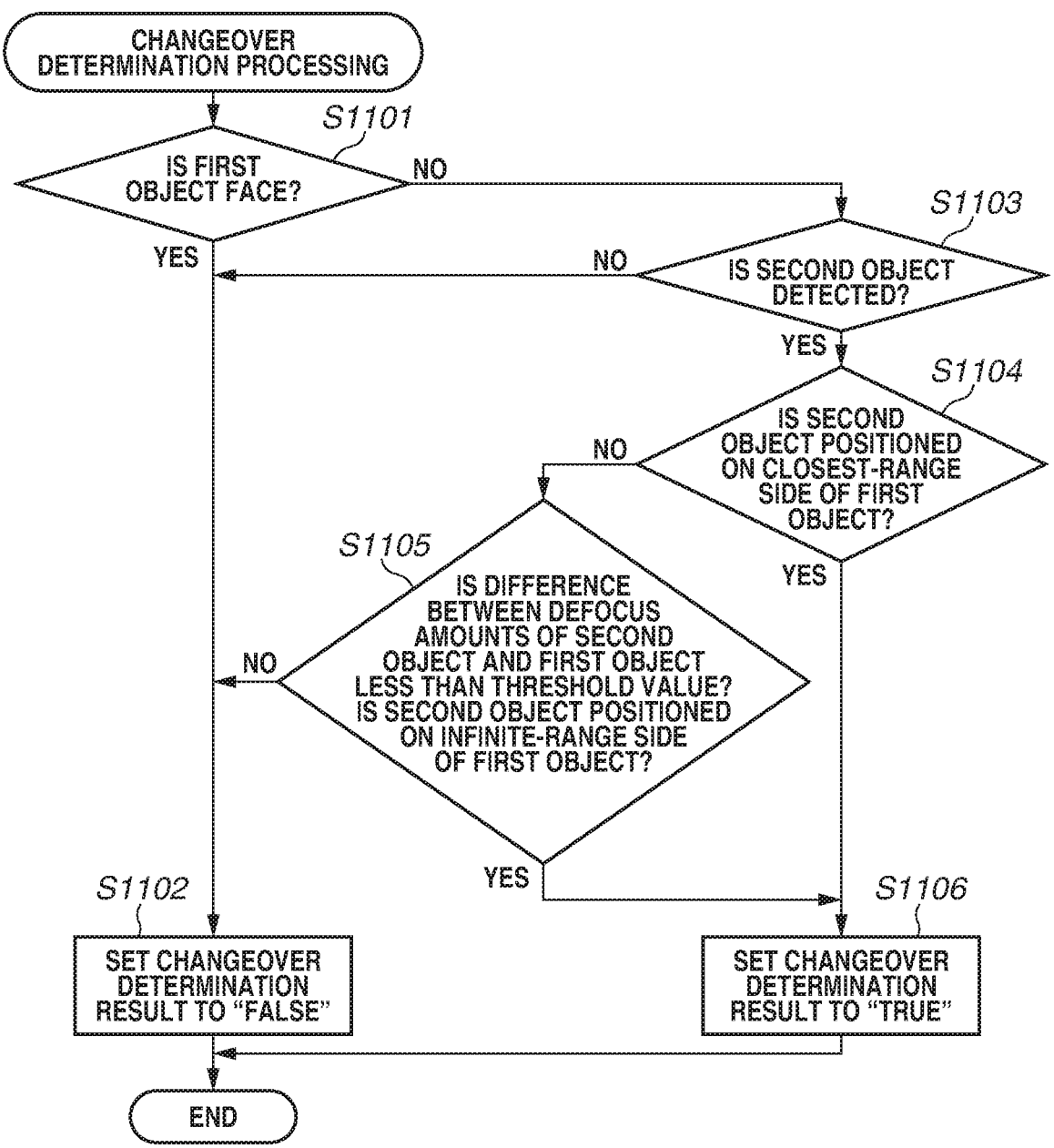
FIG. 11 is a flowchart illustrating changeover judgment processing according to the first exemplary embodiment.

Herein, the changeover judgment processing executed in step S114 of the flowchart in FIG. 5 will be described in detail with reference to FIG. 11. As described above, the changeover judgment processing is processing for judging whether the second object is an object that is to be in focus instead of the first object at that point in time.

In step S1101, the CPU 110 judges whether the object determined by the first object determination processing in step S108 is a face.

In step S1101, if the CPU 110 judges that the first object is a face (YES in step S1101), the processing proceeds to step S1102. In step S1102, the CPU 110 sets a changeover judgment result to "false" and ends the changeover judgment processing.

If the first object is a face, the first object is not changed. This is because the object currently being tracked is likely to be the main object if the tracked object is a face, so the object be unchanged.

In step S1101, if the CPU 110 judges that the first object is not a face (NO in step S1101), the processing proceeds to step S1103. In step S1103, the CPU 110 judges whether the second object is detected by the second object determination processing in step S113.

In step S1103, if the CPU 110 judges that the second object is not detected (NO in step S1103), the CPU1 110 sets the changeover judgment result to "false" in step S1102, and the changeover judgment processing is ended because there is no changeover target.

In step S1103, if the CPU 110 judges that the second object is detected (YES in step S1103), the processing proceeds to step S1104. In step S1104, the CPU 110 judges whether the second object is an object positioned on the close-range side of the first object.

If the CPU 110 determines that the second object is an object positioned on the close-range side of the first object (YES in step S1104), the processing proceeds to step S1106. In step S1106, the CPU 110 sets the changeover judgment result to "true", and the changeover judgment processing is ended.

In the above, the second object is changed to the first object. This is because an object on a close-range side is likely to be the main object in a case where the second object is positioned on the close-range side of the first object and a background is detected as the first object.

If the CPU 110 determines that the second object is not positioned on the close-range side of the first object (NO in step S1104), the processing proceeds to step S1105. In step S1105, the CPU 110 judges whether the second object is positioned on an infinite-range side of the first object within a predetermined defocus range.

In step S1105, if the CPU 110 judges that a difference between defocus amounts of the second object and the first object is less than a fifth threshold value, and the second object is positioned on the infinite-range side of the first object (YES in step S1105), the processing proceeds to step S1106. In step S1106, the CPU 110 sets the changeover judgment result to "true", and the changeover judgment processing is ended.

In step S1105, if the CPU 110 judges that a difference between defocus amounts of the second object and the first object is the fifth threshold value or more and the second object is positioned on the close-range side of the first object, or either of the foregoing conditions is satisfied (NO in step S1105), the processing proceeds to step S1102. In step S1102, the CPU 110 sets a changeover judgment result to "false" and the changeover judgment processing is ended.

Herein, the second object is changed to the first object because of the following reasons. In a case where a difference between the defocus amounts of the second object and the first object is less than the fifth threshold value, and the second object is positioned on the infinity-range side of the first object, the first object may be an object which is positioned on the close-range side of a person, such as a ground surface. In this case, a face detected as the second object is likely to be the main object.

On the other hand, in a case where a difference between the defocus amounts of the second object and the first object is the fifth threshold value or more, and the second object is positioned on the infinity-range side of the first object, the second object is likely to be a face existing in the background, which is not a main object.

Further, in the processing executed in each of steps S1104 and S1105, the CPU 110 makes the judgement, using a focus detection result corresponding to each of the first object position and the second object position, based on the focus detection results calculated by the CPU 110 in step S112 through the focus detection processing.

As described above, in the present exemplary embodiment, erroneous detection of the main object can be reduced through the various methods, so that a focus can be adjusted to an appropriate main object continuously. Further, by dynamically reselecting the main object based on a focus detection result, a focus can be adjusted to the appropriate main object continuously.

Hereinafter, a second exemplary embodiment of the disclosure will be described with reference to the appended drawings. For example, the present exemplary embodiment is different from the first exemplary embodiment in that a judgment on whether an object is a moving object is made in the focus detection processing, and a result of the judgment is taken into consideration in the changeover judgment processing. Further, for example, the present exemplary embodiment is different from the first exemplary embodiment in that conspicuousness is taken into consideration when the second object determination processing is executed. In addition, description of a configuration similar to that of the first exemplary embodiment will be omitted, and a configuration different from that of the first exemplary embodiment will be mainly described below. In the present exemplary embodiment, the CPU 110 executes moving object estimation processing and moving object judgment processing (also called as "moving object detection") described below, in addition to the processing described in the first exemplary embodiment.

<Focus Detection Processing>

Figure 12:
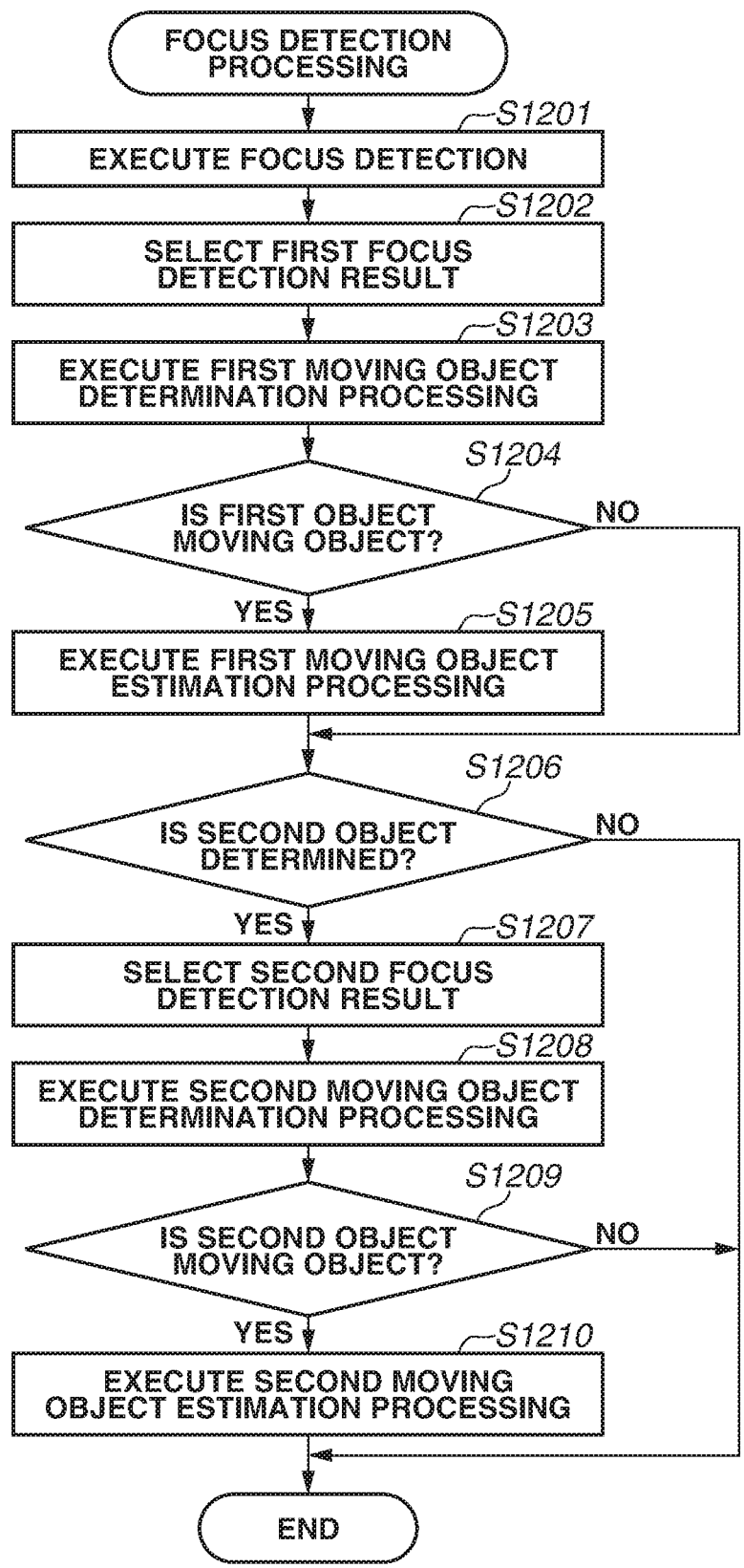
FIG. 12 is a flowchart illustrating focus detection processing according to a second exemplary embodiment.

Herein, details of the focus detection processing in step S112 of the flowchart in FIG. 5 according to the second exemplary embodiment will be described with reference to FIG. 12.

In step S1201, the CPU 110 executes focus detection processing based on the image signal acquired from the image sensor 103 in step S110.

In step S1202, based on the focus detection result acquired in step S1201, the CPU 110 selects a focus detection result corresponding to the first object position.

In step S1203, based on the focus detection result corresponding to the first object position selected in step S1202, the CPU 110 executes first moving object judgment processing.

In the first moving object judgment processing, a focus detection result corresponding to the first object position is stored as a history, and the CPU 110 judges whether the first object is a moving object based on change of the history. A result of the above judgment is also called as "first moving object detection result".

In addition, any method can be employed for the moving object judgment processing as long as it is judged whether the object is a moving object. For example, when the focus detection result is changed in a same direction for a certain period or longer, and a change amount thereof exceeds a predetermined value, the object can be judged as a moving object.

In step S1204, if the first object is judged as a moving object (YES in step S1204), the processing proceeds to step S1205. In step S1205, the CPU 110 executes first moving object estimation processing based on the focus detection result corresponding to the first object position selected in step S1202.

In the first moving object estimation processing, an in-focus position of the first object at an optional time can be estimated based on the history of the focus detection result corresponding to the first object position. Herein, an in-focus position of the first object at next accumulation time of the image sensor 103 will be estimated.

In addition, any method can be used for the moving object estimation processing as long as an in-focus position of an object at optional time can be estimated thereby. For example, estimation can be executed by using the statistical operation described in Japanese Patent Application Laid-Open No. 2001-21794.

In step S1206, based on a result of the second object determination processing in step S113, the CPU 110 judges whether the second object is determined.

In step S1206, if the second object is determined (YES in step S1206), the processing proceeds to step S1207. In step S1207, the CPU 110 selects a focus detection result corresponding to a second object position based on the focus detection result acquired in step S1201.

In step S1208, the CPU 110 executes second moving object judgment processing based on the focus detection result corresponding to the second object position selected in step S1207.

In the second moving object judgment processing, a focus detection result corresponding to the second object position is stored as a history, and the CPU 110 judges whether the second object is a moving object based on change of the history. A result of the above judgment is also called as "second moving object detection result".

In step S1209, if the second object is judged as a moving object (YES in step S1209), the processing proceeds to step S1210. In step S1210, the CPU 110 executes second moving object estimation processing based on the focus detection result corresponding to the second object position selected in step S1207.

In the second moving object estimation processing, an in-focus position of the second object at an optional time can be estimated from the history of the focus detection result corresponding to the second object position. Herein, an in-focus position of the second object at current time will be estimated.

<Second Object Determination Processing>

Figure 13:
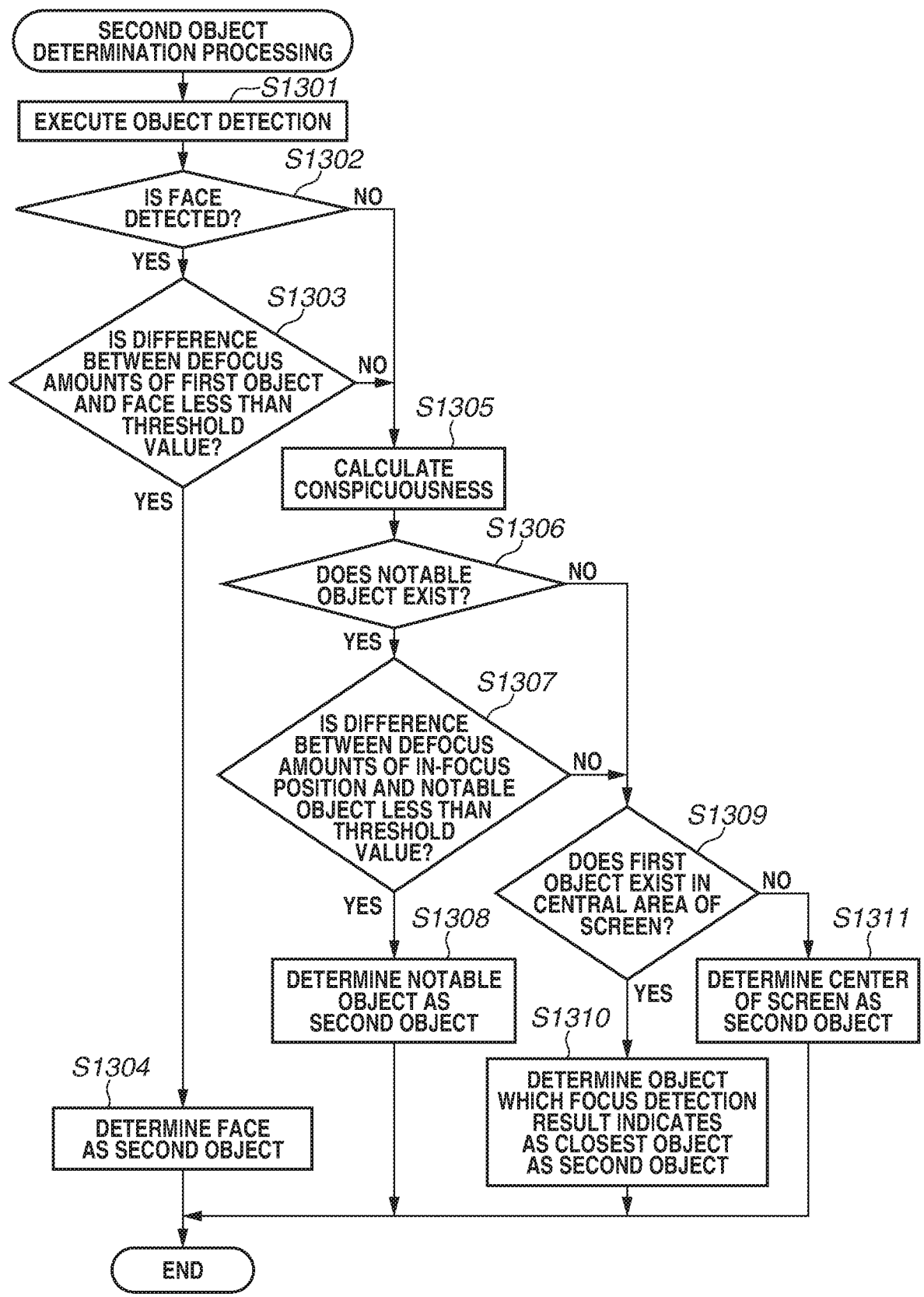
FIG. 13 is a flowchart illustrating second object determination processing according to the second exemplary embodiment.

Herein, the second object determination processing in steps S113 and S117 of the flowchart in FIG. 5 according to the present exemplary embodiment will be described in detail with reference to FIG. 13. As described above, in the second object determination processing according to the present exemplary embodiment, conspicuousness is also taken into consideration.

First, in step S1301, the CPU 110 detects an object from an image signal acquired from the image sensor 103 using the object detection unit 111.

Next, in step S1302, based on the result of detection executed in step S1301, the CPU 110 judges whether a face is detected.

In step S1302, if the CPU 110 judges that a face is detected (YES in step S1302), the processing proceeds to step S1303. In step S1303, the CPU 110 compares a defocus amount of the first object with a defocus amount of a face position. If a difference is less than the fifth threshold value (YES in step S1303), the processing proceeds to step S1304. In step S1304, the CPU 110 determines the face as the second object, and judges that the second object is detected. Then, the second object determination processing is ended.

If a difference between the defocus amount of the first object and the defocus amount of the face position is the fifth threshold value or more (NO in step S1303), the CPU 110 does not determine the detected face as the second object, and the processing proceeds to step S1305.

A focus can be adjusted to an object detected as a face more easily if a range of the threshold value is wider. However, there is a possibility that a focus is adjusted to another object, for example, detected as a face in the background audience, which is not intended by the user. Therefore, the same threshold value may be set on both of the infinity-range side and the close-range side of the in-focus position, or a range thereof may be set to be narrower on the infinity-range side and wider on the close-range side.

If the face is not detected in step S1302 (NO in step S1302), the processing proceeds to step S1305. In step S1305, the CPU 110 execute conspicuousness judgment on the image signal acquired from the image sensor 103.

In step S1306, the CPU 110 judges whether a notable object is detected in step S1305. If the notable object is detected (YES in step S1306), the processing proceeds to step S1307. If the notable object is not detected (NO in step S1306), the processing proceeds to step S1309.

In step S1307, the CPU 110 compares a defocus amount of the first object with a defocus amount of the notable object. If the difference is less than a sixth threshold value (YES in step S1307), the processing proceeds to step S1308. In step S1308, the CPU 110 determines the notable object as the second object and judges that the second object is detected. Then, the second object determination processing is ended.

If a difference between defocus amounts is the sixth threshold value or more when the focus detection results of the first object and the notable object are compared to each other (NO in step S1307), the notable object is not determined as the second object.

Although a focus can be adjusted to the notable object more easily if the threshold value has a wider range, there is a possibility that a focus is adjusted to an object such as a noticeable advertising display existing in the background which is not intended by the user.

Therefore, the same threshold value may be set on both of the infinity-range side and the close-range side of the first object, or a range thereof may be set to be narrower on the infinity-range side and wider on the close-range side.

In step S1309, the CPU 110 judges whether the first object exists in a central area of the screen.

If the CPU 110 judges that the first object exists in the central area of the screen (YES in step S1309), the processing proceeds to step S1310. In step S1310, the CPU 110 determines, as the second object, an object which the focus detection result indicates as the closest object. Then, the CPU 110 judges that the second object is detected, and the second object determination processing is ended.

This is because there is a possibility that the first object is the main object if the first object exists in the central area while the closest object exists in an area other than the central area.

In step S1309, if the CPU 110 judges that the first object does not exist in the central area of the screen (NO in step S1309), the processing proceeds to step S1311. In step S1311, the CPU 110 determines the central position of the screen as the second object, judges that the second object is detected, and the second object determination processing is ended.

This is because there is a possibility that the main object exists in the central area if the first object does not exist in the central area.

Herein, a difficulty level for determining the center of the screen as the second object is changed depending on a range of the central area, so that the range of the central area may be either reduced or increased.

<Changeover Judgment Processing>

Figure 14:
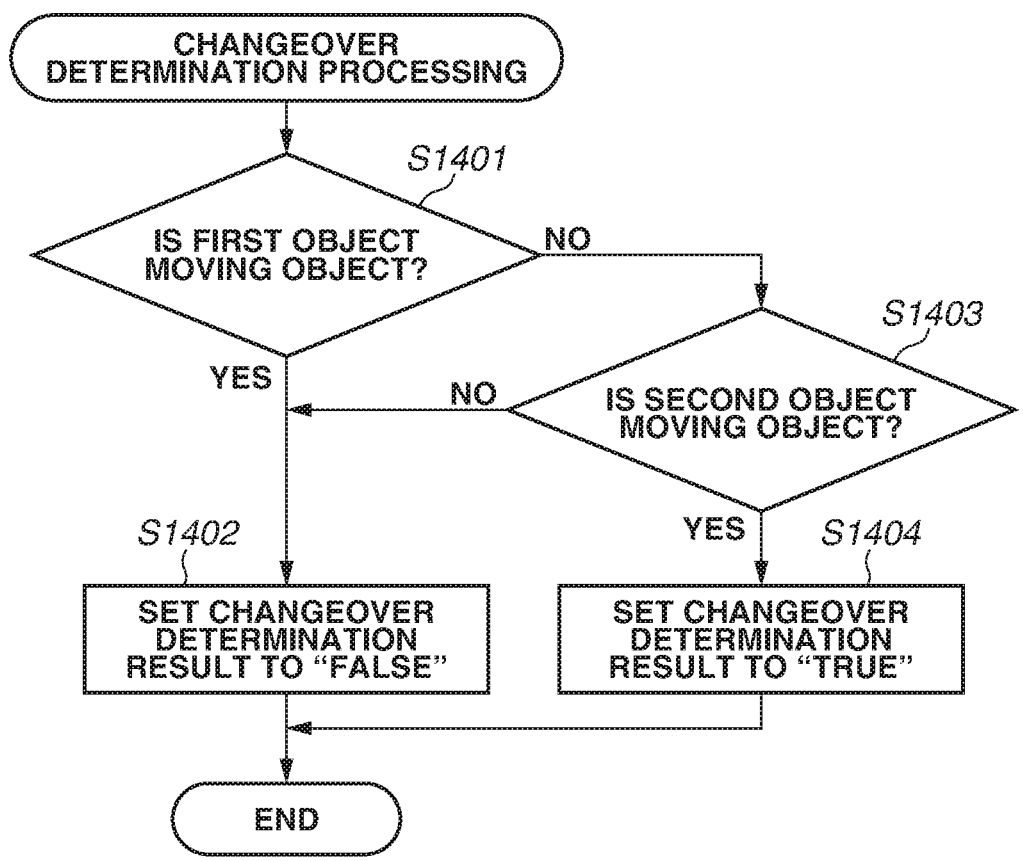
FIG. 14 is a flowchart illustrating changeover judgment processing according to the second exemplary embodiment.

Herein, the changeover judgment processing in step S114 of the flowchart in FIG. 5 according to the present exemplary embodiment will be described in detail with reference to FIG. 14. In the present exemplary embodiment, as described above, the changeover judgment processing is executed based on a result of object judgment in the focus detection processing.

In step S1401, based on a result of the first moving object judgment processing executed in step S1203, the CPU 110 judges whether the first object is a moving object.

In step S1401, if the first object is judged as a moving object (YES in step S1401), the processing proceeds to step S1402. In step S1402, the CPU 110 sets the changeover judgment result to "false", and the changeover judgment processing is ended.

If the first object is a moving object, the first object is not changed. This is because the object currently being tracked is likely to be the main object if the tracked object is a moving object. Therefore, in one embodiment, the object is to be unchanged.

In step S1401, if the first object is judged as a non-moving object (NO in step S1401), the processing proceeds to step S1403. In step S1403, based on a result of the second moving object judgment processing in step S1208, the CPU 110 judges whether the second object is a moving object.

In step S1403, if the second object is judged as a moving object (YES in step S1403), the processing proceeds to step S1404. In step S1404, the CPU 110 sets a changeover judgment result to "true", and the changeover judgment processing is ended.

In step S1403, if the second object is judged as a non-moving object (NO in step S1403), the processing proceeds to step S1402. In step S1402, the CPU 110 sets the changeover judgment result to "false", and the changeover judgment processing is ended.

In the above, the second object is changed to the first object. This is because the second object is likely to be a main object in a case where the object currently being tracked is not a moving object but the second object is a moving object.

In the processing executed in step S118 of the present exemplary embodiment, the CPU 110 converts the focus detection result into the lens driving amount by the focus adjustment unit 116, using the calculated in-focus position at the AF frame position of the object selected as the first object, and drives the focus lens 126 to execute focus adjustment.

As described above, according to the aspect of the embodiments, a moving object is judged based on the focus detection result. Then, a main object is dynamically reselected from among objects judged as a moving object, so that a focus can be continuously adjusted to an appropriate main object.

Hereinafter, a third exemplary embodiment according to the disclosure will be described with reference to the appended drawings. In addition, description of a configuration similar to that of the second exemplary embodiment is omitted, and a configuration different from that of the second exemplary embodiment will be mainly described below.

<Changeover Judgment Processing>

Herein, the changeover judgment processing in step S114 of the flowchart in FIG. 5 according to the present exemplary embodiment will be described in detail with reference to FIG. 15.

In step S1501, based on a result of the first moving object judgment processing executed in step S1203, the CPU 110 judges whether the first object is a moving object.

In step S1501, if the first object is judged as a moving object (YES in step S1501), the processing proceeds to step S1502. In step S1502, the CPU 110 judges whether the object determined by the first object determination processing in step S108 is a face.

In step S1502, if the first object is judged as a face (YES in step S1502), the processing proceeds to step S1503. In step S1503, based on a result of the second moving object judgment processing executed in step S1208, the CPU 110 judges whether the second object is a moving object.

In step S1503, if the second object is judged as a moving object (YES in step S1503), the processing proceeds to step S1504. In step S1504, the CPU 110 judges whether the object determined by the second object determination processing in step S113 is a face.

In step S1503, if the second object is judged as a non-moving object (NO in step S1503), the processing proceeds to step S1507. In step S1507, the CPU 110 sets a changeover judgment result to "false", and the changeover judgment processing is ended.

In step S1504, if the second object is judged as a face (YES in step S1504), the processing proceeds to step S1505. In step S1505, the CPU 110 compares the defocus amount of the second object with the defocus amount of the first object and judges whether the second object is positioned on the close-range side of the first object. In step S1504, if the second object is not judged as a face (NO in step S1504), the processing proceeds to step S1507. In step S1507, the CPU 110 sets a changeover judgment result to "false", and the changeover judgment processing is ended.

In addition, although a judgment on whether the second object is positioned on the close-range side of the first object can be made by using a focus detection result at a position of each object, the judgment can be also made based on the in-focus position acquired in moving object estimation processing. Further, a judgment to be made in the subsequent processing can be also made by using the in-focus position acquired by the moving object estimation processing instead of using the defocus amount acquired as a result of focus detection.

In step S1505, if the CPU 110 judges that the second object is positioned on the close-range side of the first object (YES in step S1505), the processing proceeds to step S1506. In step S1506, the CPU 110 sets a changeover judgment result to "true", and the changeover judgment processing is ended.

In step S1505, if the CPU 110 judges that the second object is not positioned on the close-range side of the first object (NO in step S1505), the processing proceeds to step S1507. In step S1507, the CPU 110 sets a changeover judgment result to "false", and the changeover judgment processing is ended.

In the above, the second object is changed to the first object. This is because the object on the near side is likely to be the main object in a case where the second object is positioned on the close-range side of the first object.

In step S1502, if the CPU 110 judges that the first object is not a face (YES in step S1502), the processing proceeds to step S1508. In step S1508, based on a result of the second moving object judgment processing executed in step S1208, the CPU 110 judges whether the second object is a moving object.

In step S1508, if the second object is judged as a moving object (YES in step S1508), the processing proceeds to step S1509. In step S1509, the CPU 110 judges whether the object determined by the second object determination processing in step S113 is a face.

In step S1508, if the second object is judged as a non-moving object (NO in step S1508), the processing proceeds to step S1513. In step S1513, the CPU 110 sets a changeover judgment result to "false", and the changeover judgment processing is ended.

In step S1509, if the CPU 110 judges that the second object is a face (YES in step S1509), the processing proceeds to step S1510. In step S1510, the CPU 110 judges whether a difference between the defocus amount of the second object and the defocus amount of the first object is less than the seventh threshold value.

In step S1509, if the CPU 110 judges that the second object is not a face (NO in step S1509), the processing proceeds to step S1513. In step S1513, the CPU 110 sets a changeover judgment result to "false", and the changeover judgment processing is ended.

In step S1510, if the CPU 110 judges that a difference between the defocus amount of the second object and the defocus amount of the first object is less than the seventh threshold value (YES in step S1510), the processing proceeds to step S1511. In step S1511, the CPU 110 judges whether a position of the second object on a plane surface is in a vicinity area of a position of the first object on a plane surface.

In step S1510, if the CPU 110 judges that a difference between a defocus amount of the second object and a defocus amount of the first object is the seventh threshold value or more (NO in step S1510), the processing proceeds to step S1513. In step S1513, the CPU 110 sets a changeover judgment result to "false", and the changeover judgment processing is ended.

In step S1511, if the CPU 110 judges that a position of the second object on a plane surface is in a vicinity area of a position of the first object on a plane surface (YES in step S1511), the processing proceeds to step S1512. In step S1512, the CPU 110 sets a changeover judgment result to "true", and the changeover judgment processing is ended. Herein, in a case where a distance between a position of the central coordinate of the second object and a position of the central coordinate of the first object on the X-Y axis plane is less than an eighth threshold value when the Z axis direction is taken as a defocus direction (depth direction), the CPU 110 judges that a position of the second object on a plane surface is in a vicinity area of a position of the first object on the plane surface.

In the above, the second object is changed to the first object. This is because the second object and the first object are likely to be an identical object, so that the focus be adjusted to the face.

In step S1501, if the first object is judged as a non-moving object (NO in step S1501), the processing proceeds to step S1514. In step S1514, the CPU 110 judges whether the object determined by the first object determination processing in step S108 is a face.

In step S1514, if the CPU 110 judges that the first object is a face (YES in step S1514), the processing proceeds to step S1515. In step S1515, based on a result of the second moving object judgment processing executed in step S1208, the CPU 110 judges whether the second object is a moving object.

In step S1515, if the second object is judged as a moving object (YES in step S1515), the processing proceeds to step S1516. In step S1516, the CPU 110 judges whether the object determined by the second object determination processing in step S113 is a face.

In step S1515, if the second object is judged as a non-moving object (NO in step S1515), the processing proceeds to step S1519. In step S1519, the CPU 110 sets a changeover judgment result to "false", and the changeover judgment processing is ended.

In step S1516, if the CPU 110 judges that the second object is a face (YES in step S1516), the processing proceeds to step S1517. In step S1517, the CPU 110 sets a changeover judgment result to "true", and the changeover judgment processing is ended.

In the above, the second object is changed to the first object. This is because the face judged as a moving object is likely to be the main object if both of the second and the first objects are judged as faces.

In step S1516, if the CPU 110 judges that the second object is not a face (NO in step S1516), the processing proceeds to step S1518. In step S1518, the CPU 110 judges whether a face priority setting is ON.

In addition, the face priority setting refers to a camera setting value saved in the memory circuit 101 according to a user instruction. If the face priority setting is ON, the CPU 110 executes control for adjusting a focus to a face when the face is detected as the object.

In a case where the face priority setting is ON, a frame indicating a position of the face may be displayed on the display unit 105 when the face is detected by the object detection unit 111.

In step S1518, if the CPU 110 judges that a face priority setting is ON (YES in step S1518), the processing proceeds to step S1519. In step S1519, the CPU 110 sets a changeover judgment result to "false", and the changeover judgment processing is ended.

In step S1518, if the CPU 110 judges that a face priority setting is not ON (NO in step S1518), the processing proceeds to step S1517. In step S1517, the CPU 110 sets a changeover judgment result to "true", and the changeover judgment processing is ended.

In the above, the second object is changed to the first object. This is because an object that is not a face but judged as a moving object is more likely to be the main object than an object that is a face but not judged as a moving object.

In step S1514, if the CPU 110 judges that the first object is not a face (NO in step S1514), the processing proceeds to step S1520. In step S1520, based on a result of the second moving object judgment processing executed in step S1208, the CPU 110 judges whether the second object is a moving object.

In step S1520, if the second object is judged as a moving object (YES in step S1520), the processing proceeds to step S1521. In step S1521, the CPU 110 sets a changeover judgment result to "true", and the changeover judgment processing is ended.

In the above, the second object is changed to the first object. This is because the object judged as a moving object is more likely to be the main object than the object judged as a non-moving object.

In step S1520, if the second object is judged as a non-moving object (NO in step S1520), the processing proceeds to step S1522. In step S1522, the CPU 110 judges whether the object determined by the second object determination processing in step S113 is a face.

In step S1522, if the CPU 110 judges that the second object is a face (YES in step S1522), the processing proceeds to step S1523. In step S1523, the CPU 110 judges whether the face priority setting is ON.

In step S1523, if the CPU 110 judges that the face priority setting is ON (YES in step S1523), the processing proceeds to S1521. In step S1521, the CPU 110 sets a changeover judgment result to "true", and the changeover judgment processing is ended.

In the above, the second object is changed to the first object. This is because the object judged as a face is more likely to be the main object than the object that is not judged as a face when the face priority setting is ON.

In step S1523, if the CPU 110 judges that the face priority setting is not ON (NO in step S1523), the processing proceeds to step S1524. In step S1524, the CPU 110 sets a changeover judgment result to "false", and the changeover judgment processing is ended.

In step S1522, if the CPU 110 judges that the second object is not a face (NO in step S1522), the processing proceeds to step S1524. In step S1524, the CPU 110 sets a changeover judgment result to "false", and the changeover judgment processing is ended.

As described above, according to the aspect of the embodiments, a moving object is judged based on a result of focus detection, and a main object is dynamically re-selected based on the object judged as a moving object. With this configuration, a focus can be adjusted to an appropriate main object continuously.

Further, by making a judgment on whether to reselect the main object based on whether the object is a face, it is possible to prevent the main object from being reselected erroneously.

Effect of the Aspect of the Embodiments

According to the aspect of the embodiments described in the first, the second, and the third exemplary embodiments, a focus can be more precisely adjusted to a main object intended by the user.

Other Exemplary Embodiments

In the above-described exemplary embodiments, a judgment method mainly employing a defocus amount has been described as an example. However, any method using information other than the defocus amount can be employed as long as a focus detection result can be obtained in the method. For example, as an alternative, information corresponding to an image shift amount or a distance can be employed.

Further, in the above-described exemplary embodiments, although detection of a face has been described as an example, an object to be detected is not limited to a face, and the object may be a predetermined object detected by the tracking processing. For example, a template for the tracking processing is previously set with respect to an object desired to an imaging target, and the object may be detected in place of the face described in the present exemplary embodiment.

The aspect of the embodiments can be realized in such a manner that a program for realizing one or more functions according to the above-described exemplary embodiments is supplied to a system or an apparatus via a network or a storage medium, so that one or more processors in the system or the apparatus read and execute the program. Further, the aspect of the embodiments can be also realized with a circuit (e.g., application specific integrated circuit (ASIC)) that realizes one or more functions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-125534, filed Jun. 29, 2018, No. 2018-125535, filed Jun. 29, 2018, and No. 2018-125536, filed Jun. 29, 2018, which are hereby incorporated by reference herein in their entirety.

What is claimed is:

1. An apparatus comprising:
    at least one processor; and
    a memory coupled to the at least one processor, the memory having instructions that, when executed by the processor, performs operations as:
    a focus detection unit configured to execute focus detection based on a signal output from an image sensor;
    a control unit configured to control driving of a focus lens;
    a determination unit configured to determine a main object to be tracked by the focus lens after the control unit controls driving of the focus lens to adjust a focus on a first object detected based on a result of the focus detection,
wherein the determination unit determines a second object as the main object based on conspicuousness in a case where a focus detection result corresponding to the second object is smaller than a first threshold value, and determines the main object regardless of the conspicuousness in a case where the difference between the focus detection result and the position corresponding to the second object is greater than or equal to the first threshold value.

2. The apparatus according to claim 1, wherein the determination unit determines the second object as the main object, in a case where the focus detection result corresponding to the second object is smaller than the first threshold value, and the conspicuousness corresponding to the second object is greater or equal to a second threshold value.

3. The apparatus according to claim 2, wherein, in a case where the focus detection result corresponding to the second object is smaller than or equal than the first threshold value, and the conspicuousness corresponding to the second object is smaller than the second threshold value, the determination unit determines the main object based on the focus detection result.

4. The apparatus according to claim 1, wherein, in a case where a face is detected, and a defocus amount corresponding to the face is equal to or greater than a third threshold value, the determination unit determines the main object based on the conspicuousness.

5. The apparatus according to claim 4, wherein, where a face is detected, and a defocus amount corresponding to the face is less than the first threshold value, the determination unit determines an object corresponding to the face as the main object.

6. The apparatus according to claim 1, wherein the conspicuousness is an evaluation value calculated based on at least one of hue, saturation, and luminance of an image signal.

7. A method comprising:
executing focus detection based on a signal output from an image sensor;
controlling driving of a focus lens;
determining a main object to be tracked by the focus lens through determination, after driving of the focus lens is controlled to adjust a focus on a first object detected based on a result of the focus detection,
wherein a second object is determined as a main object based on conspicuousness in a case where a detection result corresponding to the second object is smaller than a first threshold value, and the main object is determined regardless of the conspicuousness in a case where the difference between the focus detection result and the position corresponding to the second object is greater than or equal to than the first threshold value.

8. The method according to claim 7, wherein the determining determines, the second object as a main object, in a case where the focus detection result corresponding to the second object is smaller than the first threshold value and corresponding to an area in which and the conspicuousness corresponding to the second subject is greater or equal to a second threshold value.

9. The method according to claim 8, wherein, in a case the first threshold value and the conspicuousness corresponding to the second subject is smaller than the second threshold value, the determining determines the main object based on the focus detection result.

10. The method according to claim 7, wherein, in a case where a face is detected as an object, and a defocus amount corresponding to the face is equal to greater than a third threshold value, the determining determines the main object based on the conspicuousness.

11. The method according to claim 10, wherein, in a case where face is detected, and a defocus amount corresponding to the face is less than the first threshold value, the determining determines an object corresponding to the face as the main object.

12. The method according to claim 7, wherein the conspicuousness is an evaluation value calculated based on at least one of hue, saturation, and luminance of an image signal.

* * * * *